United States Patent
Cooke

[11] 3,892,046
[45] July 1, 1975

[54] FLUIDISED BED APPARATUS

[75] Inventor: Michael Jonathan Cooke, Cheltenham, England

[73] Assignee: Coal Industry (Patents) Limited, London, England

[22] Filed: May 14, 1974

[21] Appl. No.: 469,637

[30] Foreign Application Priority Data
June 8, 1973 United Kingdom............... 27325/73

[52] U.S. Cl..................... 34/57 A; 34/10; 110/28 J
[51] Int. Cl.............................................. F26b 17/10
[58] Field of Search........ 34/10, 33, 57, 57 A, 57 B; 432/15, 58; 23/284, 288 S; 110/285, 28 J; 122/40

[56] References Cited
UNITED STATES PATENTS

| | | | |
|---|---|---|---|
| 2,503,788 | 4/1950 | White | 23/284 |
| 3,397,657 | 8/1968 | Tada | 110/8 F |
| 3,598,374 | 8/1971 | Nauta | 34/57 A |
| 3,752,224 | 8/1973 | Sproul | 34/57 R |

Primary Examiner—Kenneth W. Sprague
Attorney, Agent, or Firm—Stevens, Davis, Miller & Mosher

[57] ABSTRACT

Fluidised bed apparatus includes a grid comprising a number of manifolds each having fluidising medium inlets in the form of pipe stubs. The manifolds of the grid are spaced apart in mutually parallel fashion such as to allow relatively large agglomerates to pass between them to the base of the apparatus whence they are removed. A fluid medium distributor may be positioned in the apparatus below the grid in such a manner as to assist in the removal of the agglomerates from the apparatus when this becomes necessary.

6 Claims, 2 Drawing Figures

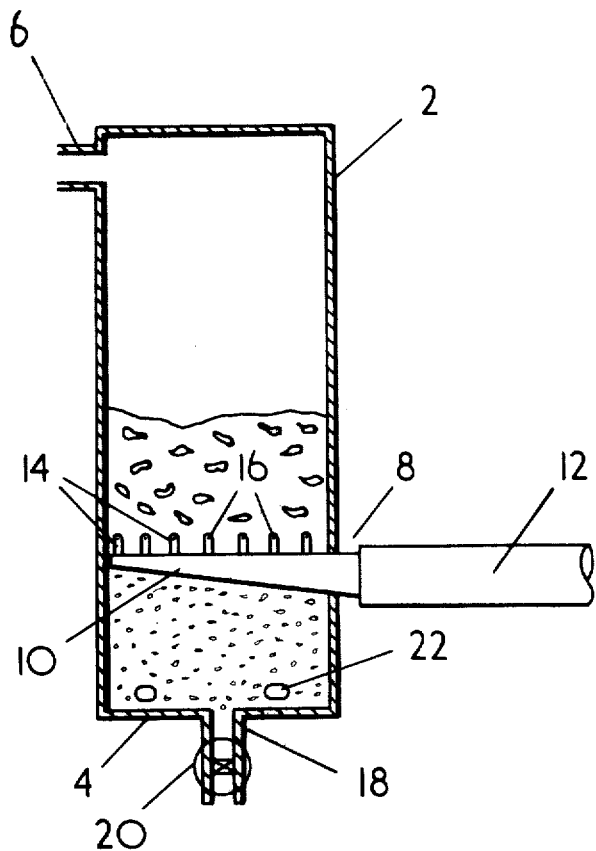
FIG. I.
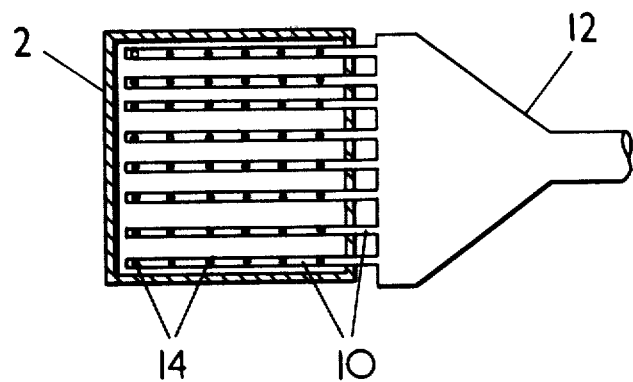
FIG 2

FLUIDISED BED APPARATUS

This invention concerns improvements in or relating to fluidised bed apparatus.

In some processes employing fluidised beds, agglomeration forms an important part of the process. For example, in the drying of thickened colliery tailings — a coal washery product containing carbonaceous matter and clay like materials e.g. shale — the ash product resulting from the drying process is agglomerated into ash particles of a size larger than the original particles of shale, such sized ash particles being referred to an 'oversize particles' or 'oversize material'. In such a drying process it is not always possible to control particle size with a large degree of exactness. For example, ash particles of a large size are formed such that fluidisation thereof is not possible. This formation can have a deleterious effect on the operation of the bed as the large particles gravitate to the bottom of the bed and collect there thereby causing partial defluidsation of the bed in the lower region. Such defluidisation, as the process continues, progresses until substantially the whole of the bed becomes defluidised.

The object of the present invention is therefore to provide fluidised bed apparatus which allows of the removal of oversize material from the main bed thereby permitting satisfactory fluidisation of the bed during the process.

According to the invention fluidised bed apparatus includes a body, a grid located within the body and spaced from the base of the body, and fluidising medium inlet means on the grid.

Conveniently the grid comprises fluid medium manifolds with which the inlet means are in fluid connection. The spacing of the manifolds is conveniently such as to allow the passage of oversize material between them into the space below.

A fluid medium distributor may be located within the space adjacent the base of the body and a discharge outlet for oversize material and other excess bed material is located in the base.

The body of the apparatus is provided with a gas discharge outlet and a material feed inlet.

By way of example only one embodiment of fluidised bed apparatus according to the invention is described below with reference to the accompanying drawing in which:-

FIG. 1 is a sectional side view; and
FIG. 2 is a sectional plan view of FIG. 1

Referring to the drawing, fluidised bed apparatus comprises a body 2 having a base 4 and a gas discharge outlet 6. A grid 8 is located within the body 2 and comprises a plurality of fluid medium manifolds 10 each in fluid connection with a main supply manifold 12. Fluid inlet means 14 are situated on each manifold 10 and in fluid connection therewith. Each of means 14 is in the form of a stub pipe closed at its end remote from manifold 10 and having discharge apertures 16.

The base 4 has a discharge outlet 18 for excess bed material and the oversize agglomerated material and a control valve 20 or other control means is associated therewith.

Within the space below grid 8 is a fluid medium distributor 22 positioned adjacent the base 4, a suitable supply connection (not shown) being provided for the distributor.

In operation, a bed of material is generally supported by grid 8 and fluidised by air or gas through the means 14. Material for treatment or combustion is fed into the bed which may be at an elevated temperature such for example as 800°C. When some of the material agglomerates and becomes oversized, the agglomerates gravitate to the level of the apertures 16 and thence pass through the grid 8 between manifolds 10 into the space below from where the agglomerates and any excess bed material are removed using outlet 18. This obviates the risk of such agglomerates remaining above the grid and possibly causing defluidisation.

The distributor 22 may be activated to introduce fluid e.g. gas or air into the space to agitate the material should this be necessary to promote outflow of the material. In addition it may be desired to introduce further fluidising air or gas for the bed and in activating the distributor gas or air supply the gas or air may pass through the hot material within the space thereby effecting a degree of preheat.

I claim:

1. Fluidised bed apparatus including a body, a base connected to the body, a grid located in the body above the base to define a discharge space between the base and the grid, a discharge outlet in the base below the grid, the grid comprising a plurality of fluidising medium manifolds, and fluidising medium inlet means on the manifolds of the grid, means spacing said manifolds apart so as, in use, to allow the passage of agglomeraed particles through the grid between the manifolds into said discharge space and then through the discharge outlet.

2. Apparatus according to claim 1 in which the grid comprises fluid medium manifolds with which the inlet means are in fluid connection.

3. Apparatus according to claim 2 in which a main manifold is provided in fluid connection with the fluid medium manifolds.

4. Apparatus according to claim 2 in which the fluidising medium inlet means comprise pipe stubs having their ends remote from the fluid medium manifolds closed, discharge apertures being provided in the pipe stubs.

5. Apparatus according to claim 1 in which a control valve is associated with the discharge outlet.

6. Apparatus as claimed in claim 1 in which a fluid medium distributor is located adjacent the base between the base and the grid.

* * * * *